July 2, 1929.  C. A. HENRY  1,719,011
RAIL CONNECTING SYSTEM FOR RAILROADS AND THE LIKE
Filed July 13, 1928  4 Sheets-Sheet 1
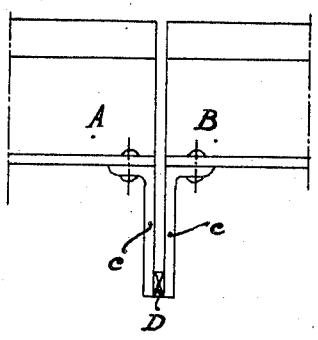
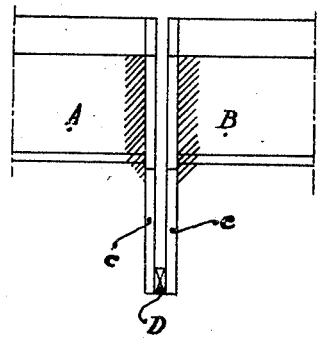
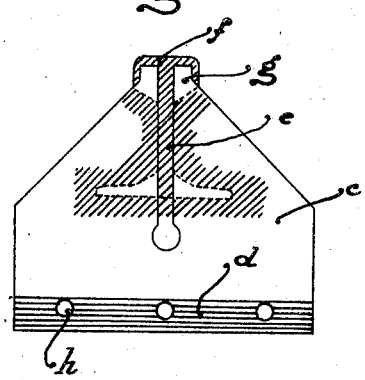
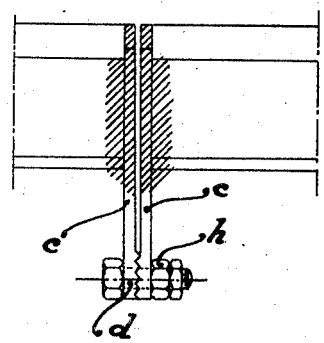
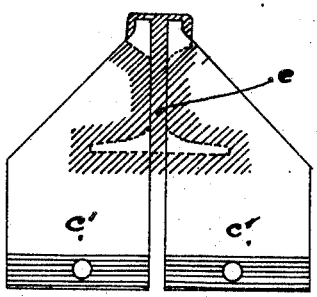
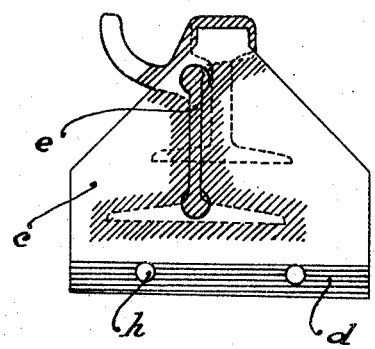

July 2, 1929.  C. A. HENRY  1,719,011

RAIL CONNECTING SYSTEM FOR RAILROADS AND THE LIKE

Filed July 13, 1928    4 Sheets-Sheet 2

Inventor
Charles A. Henry
By Henry Orth
Atty

July 2, 1929.  C. A. HENRY  1,719,011
RAIL CONNECTING SYSTEM FOR RAILROADS AND THE LIKE
Filed July 13, 1928  4 Sheets-Sheet 3

Inventor
Charles A. Henry
By Henry Orth Jr
Atty.

July 2, 1929.    C. A. HENRY    1,719,011
RAIL CONNECTING SYSTEM FOR RAILROADS AND THE LIKE
Filed July 13, 1928    4 Sheets-Sheet 4
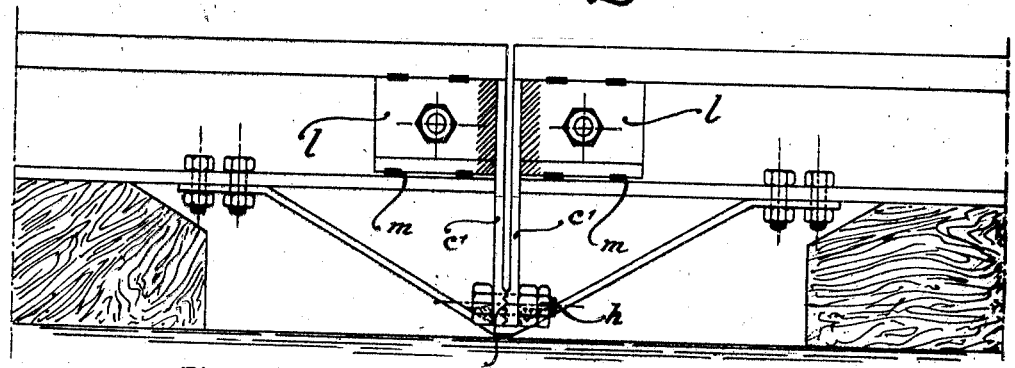
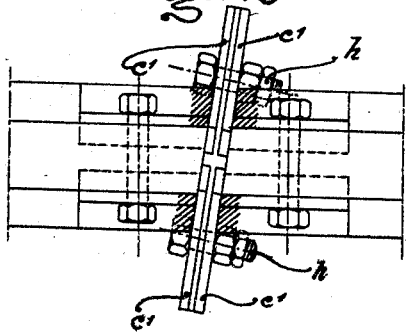
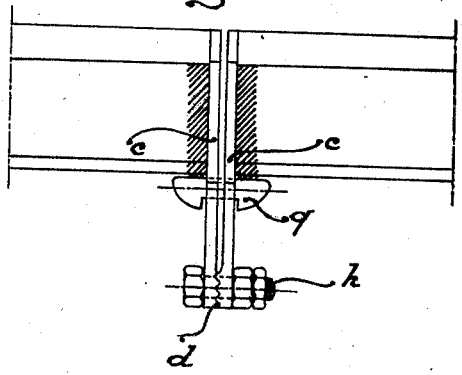
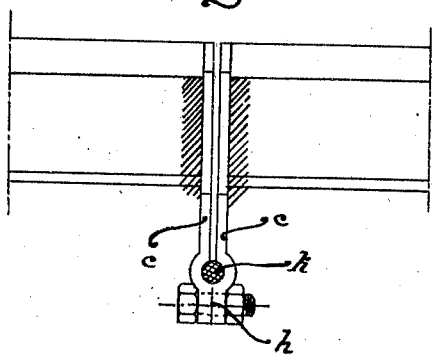
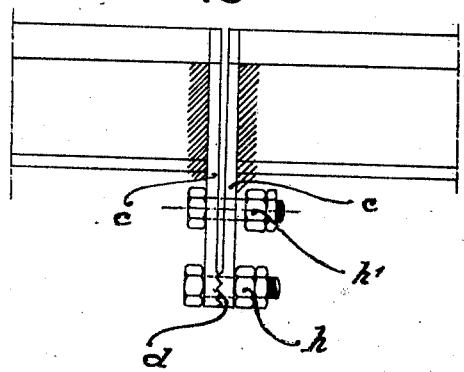

Patented July 2, 1929.

1,719,011

UNITED STATES PATENT OFFICE.

CHARLES ALBERT HENRY, OF PARIS, FRANCE.

RAIL-CONNECTING SYSTEM FOR RAILROADS AND THE LIKE.

Application filed July 13, 1928, Serial No. 292,492, and in France February 3, 1928.

It is well known that the rails composing a railroad are actually assembled by longitudinal fishing, that is to say by means of fish-plates or splice-bars laid in parallel with the rails, and wedged in by locking bolts placed on the side of the rails in the recess of the fish-plate.

My invention has for its object a new method for fishing of rails which may be described as "transverse fishing" whereby the conditions imposed upon the longitudinal fishing are satisfactorily filled both as regards resistances and the possibilities of expansion and contraction of the bars.

This new method of fishing is based on the utilization of resilient steel plates provided one for every length of rail and secured by any appropriate means to the corresponding length of rail in a transverse plane, that is, in a perpendicular or an inclined direction relatively to the longitudinal axis of the rail, the plates at the ends of the rails to be joined together being secured for instance by means of rivets, or bolts, by welding, etc. As there is left between two plates where thus assembled a certain free space in the connecting zone with the rail, these plates are connected together under said zone, outside the outline of the rail by means of bolts, ribs, hinges, knee joints, or else welded or keyed together or by any other devices in order to allow for the expansion and the contraction of the rails to take place above owing to their resiliency.

The present mode of transverse assembling by means of plates may be applied not only to railroads, utilizing rails of the same kind, (flange rails or double headed rails) but also rails of different cross-sections, as well as for connecting metal parts of all kinds, either exactly end to end or almost end to end, so as to provide expansion play. It may be applied for example to girders in general and more especially to metal bridge girders or reinforced concrete bridge girders.

The assembling of rails according to my invention may be executed in various manners the modes of execution being similar as regards the principle but varying either in the manner of securing the plates at the ends of the rails or in the way in which they are connected together outside the rail, or again, in the mode of execution of the plates themselves.

According to a first mode of execution the plates are secured directly to the rail. They may be single or made in two parts placed on either side of the web, always in the same transverse plane.

In a second embodiment of my invention the plates made of two elements which are symmetrical relatively to the vertical plane of the rail are fixed upon the latter by means of parts at right angles to said plates, such as portions of ordinary so-called longitudinal fish-plates.

According to a third modification both plates may be naturally connected so as to constitute a single part conveniently provided with a middle fold to ensure the resiliency of the joint.

The plates may be supported by collars secured upon the foot of the rail and passing under the joint in the lower parts of the plates whether the latter are secured directly or not to the rail.

In the accompanying drawings I have illustrated by way of examples several different forms embodying the principles of this invention in which Figs. 1, 2, 3, 4, 5, 6 concern the first mode of execution of my invention the plates being secured directly to the rails.

Figs. 1 and 2 are side views illustrating diagrammatically two modes of execution of the connection.

Figs. 3 and 4 are respectively an end view and a side view of a third mode of execution of the connection.

Fig. 5 is an end view of a modification of the connection illustrated in Figs. 3 and 4.

Fig. 6 represents another modified form of the device in the case of two rails having different cross-sections.

Figs. 7 and 8 are perspective views of a plate element and its locking device.

Figs. 9 and 10 are perspective views of a length of rail in which the foot is notched in various manners.

Figs. 11, 12 and 13 are respectively an end, side and perspective view of the connection formed by the plate element and its locking device shown in Figs. 7 and 8.

Figs. 14 and 15 show a connection according to the third mode of execution in which both plates are made in one piece.

Fig. 16 is a side view of a connection according to the first mode of execution, improved by the addition of a support.

Fig. 17 is a similar view of the second mode of execution.

Figs. 18 and 19 are respectively a side view and a plan view of a connection with skew joint.

Figs. 20, 21 and 22 are side views illustrating three modified forms of the connection of the plates.

Figure 7:
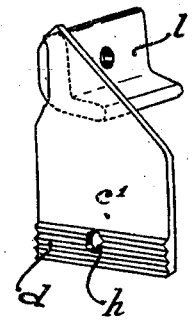
Figs. 7, 8, 9, 10, 11, 12, 13, 14 and 15 illustrate the second mode of execution in which the plates are not secured directly to the rails.

In the first embodiment of the principle on which my invention is based illustrated in Fig. 1, the plates $c, c$ are each provided with a wing to allow of fixing them under the foot of the two rail lengths A, B. The connection at D under the rails may be of any appropriate type in order to prevent the plates coming apart or sliding relatively to each other.

The modified form shown in Fig. 2 differs only from the former in that the plates $c, c$ are engaged here upon the whole section of the rails to which they are secured by welding for example.

In the practical embodiment of the present invention shown in Figs. 3 and 4, the plates are constituted by two cut-out steel blades welded to the ends of the rails.

The plate is provided in front of the rail web with a notch $e$ designed to increase the number of points welded with the edge of the rail, welding steel being introduced in the recess $e$ of the cut-out part in order to engage the web of the rail in such a manner as to constitute an extension of said web in the plate. This connection would be almost sufficient by itself to secure the plate to the rail but it is preferable to increase the number of welded surfaces and run the welding metal on the whole circumference of the rail in order to reinforce the section of the joint. Thus moreover air and water cannot enter between the edge of the rail and the plate, so that consequently rust cannot be produced on that point.

The welding material is thus brought also at the top of the joint at $f$ in order to fill the free space and bring the plate on the same plane as the running surface of the rail, and at $g$ to ensure the continuity of the section. The width of the steel blades $c$ increases slightly under the head of the rail in order to offer a sufficiently large section to transmit the stress and to resist to lateral stresses (horse-shoe movements) which tend to displace one end of a rail relatively to the other. In this region both plates are striated in such a manner as to form teeth $d$ along its whole width. The teeth engaging reciprocally the two plates are securely joined together and are maintained thus assembled by means of bolts $h$. There is thus produced a perfect connection which transmits the stresses from one plate to the other and consequently from one rail to the next, providing also in the upper region owing to the resiliency of the plates for the varying length of the rails.

Owing to the combined resistance of the bolts and of the teeth a suitable strength may be obtained in a reduced space. The conjunction of striæ in this arrangement involves the use of two kinds of plates that is male and female plates.

In order to dispense with the machining of the notch in the web of the plate and to prevent the resulting loss of metal, the plate may be divided in two parts $c^1, c^1$ which may be called "twin plates" (Fig. 5). The slot $e$ is produced by the separation between two half-plates the connection and the position of which being ensured by the striæ.

It will be evident that plates of cast steel may be used to fish rails said plates being of a suitable shape and provided with cast striæ. The latter could also be made by rolling and the plates be cut out in sheet metal.

The rails assembled together in the manner above described may be of different cross section provided that the striæ and the bolt holes are in the same position relatively to the running surface of the rail.

Fig. 6 shows the arrangement employed for connecting a Vignole rail with a grooved rail. It will then be sufficient for each plate that the notch $e$ be adapted to the web of the corresponding rail in order that the welding upon the web which gives the best joint may be as complete as possible. For the plate which engages the grooved rail said notch will preferably be closed on the circumference.

Twin plates of an appropriate shape may also be used and in that case they would no longer be symmetrical.

Figure 8:
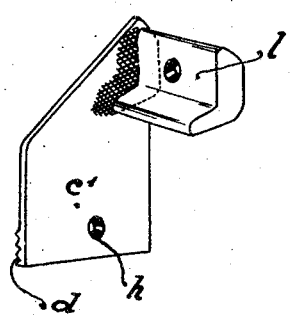
Figure 9:
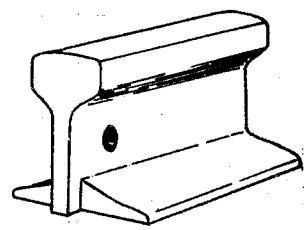
Figure 11:
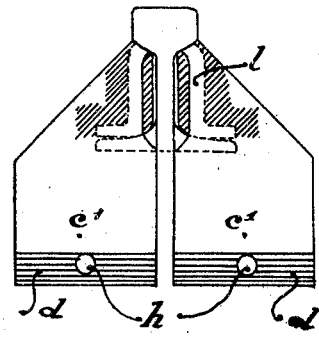
Figure 10:
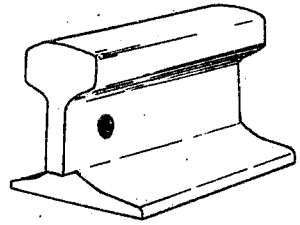
Figure 12:
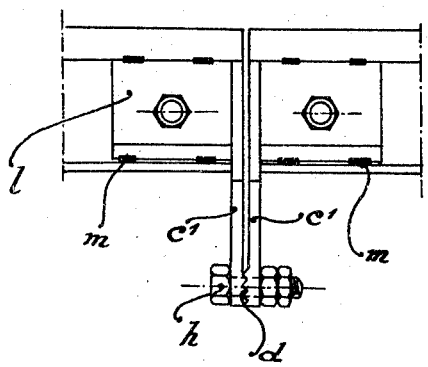
Figure 13:
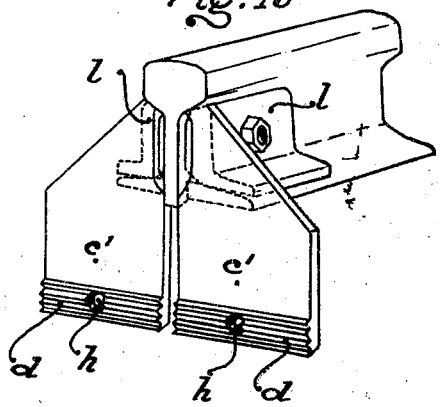

In order to adapt the present system of connection to existing rails I may use twin plates made in one piece having a particular profile which may be a portion of an ordinary longitudinal fish-plate $l$ as will be seen in Figs. 7 and 8. The whole will then be easily secured by means of bolts to the ends of the rails to be assembled the foot of which has been simply notched to correspond with the thickness of the plate, as shown in Figs. 9 and 10, to allow of the plate passing under the rail, the plate being in that case flush with the web and head of the rail. The half-joint presents the shape shown in Figs. 11 and 13, the parts $l$ being wedged in between the head and the foot of the rail. The joint will preferably be made perfect by welding at $m$, (Fig. 12) in order to connect more closely the fish-plate elements $l$ with the rails.

Figure 14:
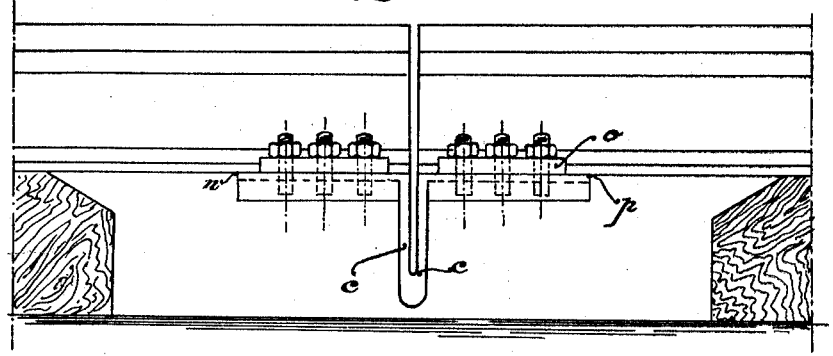
Figure 15:
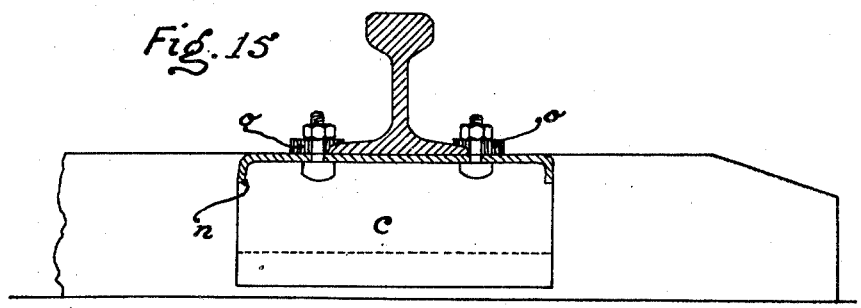

The plates c c may also be made in one piece as shown in Figs. 14 and 15 and in that case the connection D shown in Fig. 1 is not necessary. The whole device is constituted by a piece of sheet metal n forming in the middle a U with resilient arms and shouldered portions for fixing the plate to the foot of the rails by means of clips o and bolts p for example. The width of the plates allows the packing by the ballast that thus supports the joint.

In all cases the connection of the rails may be made stronger by supporting the zone of the greatest stress, that is the joint of the plates, by means of a lower flange which engages the foot of the rails.

Figures 16, 18:
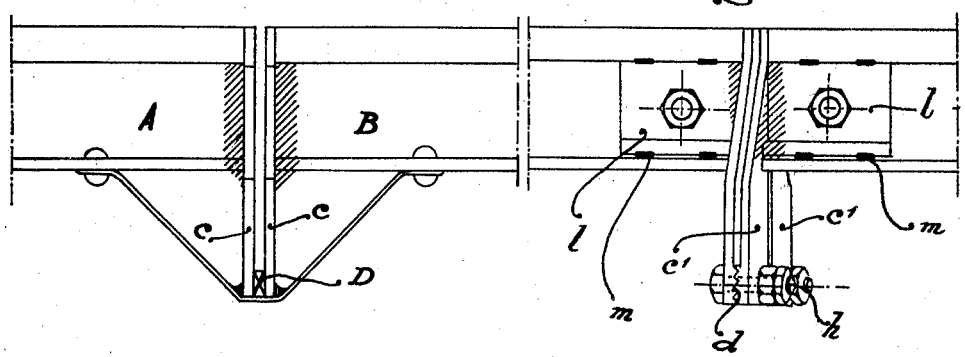

Fig. 16 shows the embodiment of the said arrangement. Fig. 17 shows its application to the type of connection illustrated in Fig. 12. The present invention allows besides the principal types of connection already described the execution of a connection with skew joint.

Figs. 18 and 19 represent a connection of that type in which the plates designed to fish the rails are secured to the latter by means of parts l. This joint will facilitate the running of the vehicles the wheels being continuously supported as they pass from one rail to the other. The accidental slipping at the joint is effectually prevented by the friction of the two striated parts.

In all the modes of assembling above described some of the arrangements indicated may be replaced by similar ones. Wedges or keys may be substituted for the striæ as shown in Fig. 20 where the key k is surrounded by two plates clamped together by bolts h; the shearing stress being transferred to the wedge. The plates may also be assembled together by means of bolts.

Lastly, arrangements may be provided to limit the opening of the joint in the case of the bars contracting by very low temperatures or of creeping of the rails. The two plates may be secured by means of a wedge $g$ (Fig. 21) or of a bolt $h^1$ (Fig. 22).

The system of fishing the rails as above described allows of giving in a very simple manner a good electrical insulation to a couple of rails assembled together. This result may be obtained by the interposition of a sheet of fibrous material introduced between the striæ and wedged in. The locking bolts will of course also be insulated.

It will be evident that although I have described my invention in its application for connecting rail lengths together it may also be advantageously applied to the assembling of section irons of all kinds every time that free play must be provided for expansion.

What I claim and desire to secure by Letters Patent of the United States is:

1. A rail connecting system which comprises a steel plate placed transversely at each end of each rail, means for securing both plates at the adjacent ends of the rails, a free space being provided in the region opposite the section of the rail, and connecting means for said plates outside said section, in such a manner as to prevent sliding of one plate relatively to the other in every direction.

2. A rail connecting system which comprises a steel plate at the ends of each rail placed perpendicularly to same, both plates being separated by a free space in the region opposite the end of the rail, and means for connecting the plates outside said end in such a manner as to prevent the plates sliding one relatively to the other.

3. A rail connecting system which comprises a steel plate placed perpendicularly at each end of each rail, said plate extending under the rail and being secured to same, and connecting means between adjacent plates under the foot of the rail, a free space being left above between the plates in order to provide for expansion of the parts and to prevent the relative sliding movement of the plates.

4. A rail connecting system which comprises two half-plates placed perpendicularly at the end of each rail, said half-plates being arranged in the same plane on either side of the web of the rail and secured on same and extending under the rail, and means to connect in that region the four half-plates of the connecting device, said means providing at the top the necessary free space for expansion and preventing the relative sliding of the plates in all directions.

5. A rail connecting system which comprises: a plate perpendicular to said rail disposed on the end of each rail, said plate extending under the rail and secured to same, striæ formed in the lower part of said plate and conjugated with the striæ of the opposite plate with which they engage, said striæ projecting from the plates in such a manner that a free space is provided between the plates above same, and bolts and screws to clamp the two striated parts.

In testimony that I claim the foregoing as my invention, I have signed my name.

CHARLES ALBERT HENRY.